UNITED STATES PATENT OFFICE.

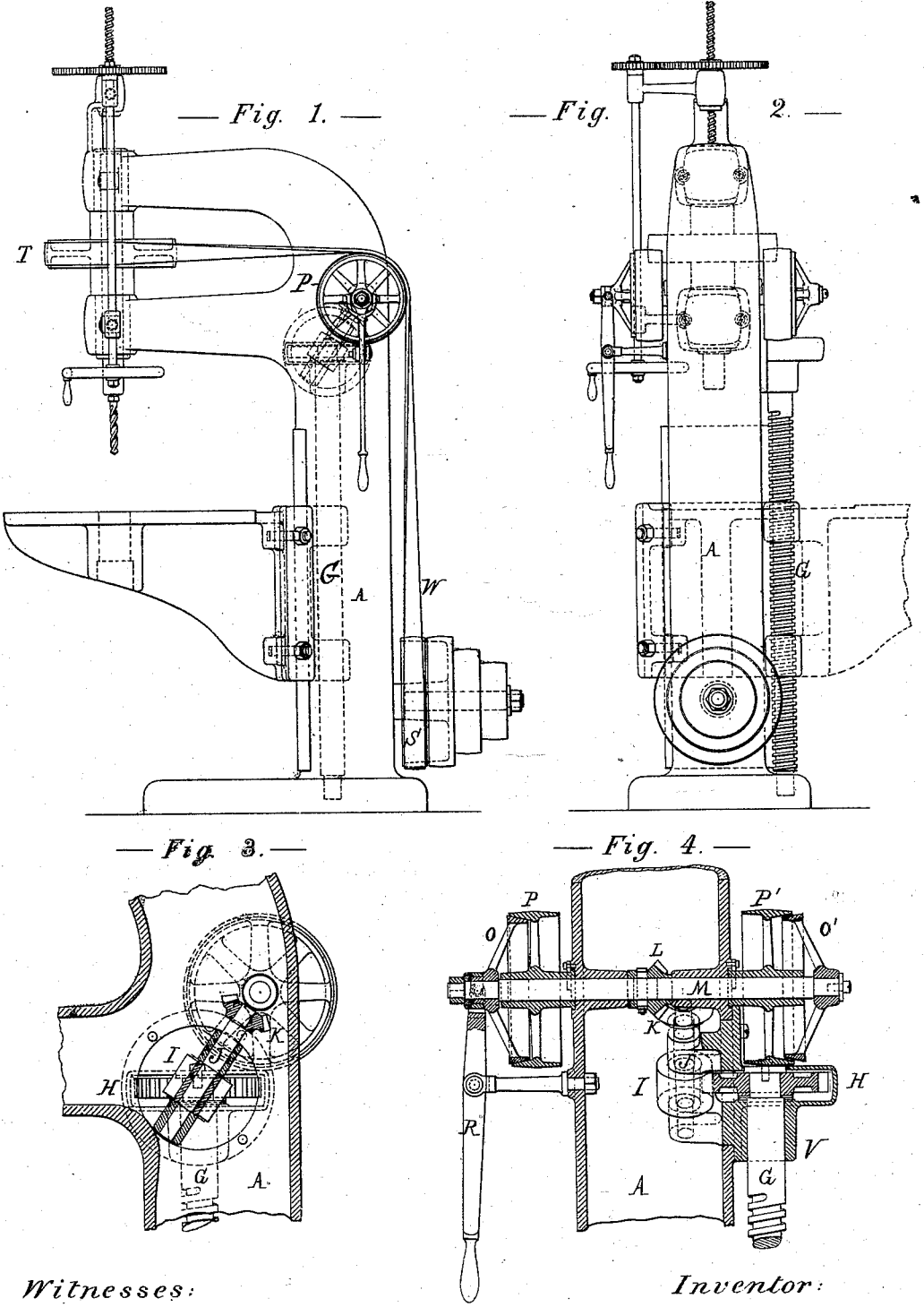

WILLIAM SELLERS, OF PHILADELPHIA, PENNSYLVANIA.

IMPROVEMENT IN METAL-DRILLING MACHINES.

Specification forming part of Letters Patent No. 172,056, dated January 11, 1876; application filed November 24, 1875.

*To all whom it may concern:*

Be it known that I, WM. SELLERS, of the city and county of Philadelphia, in the State of Pennsylvania, have invented certain new and useful Improvements in Drilling-Machines, of which improvements the following is a specification:

My invention relates to that class of drilling-machines in which the drill-spindle stands in a vertical position above a horizontal table supporting the work, toward which the drill is fed in a downward direction, while the table is provided with a vertical adjustment of considerable range.

The object of my invention is to provide a simple and convenient means of adjusting the height of the table by power, using for this purpose parts previously employed only in driving the drill-spindle.

In the accompanying drawing, forming part of this specification, Figure 1 is a side elevation of a vertical drilling-machine embodying my improvements. Fig. 2 is an end view of the same. Fig. 3 is a side view, partly in section, of parts specially used in raising the table. Fig. 4 is an end view, partly in section, of the parts shown in Fig. 3.

In Letters Patent of the United States granted to me July 2, 1872, for an improvement in drilling-machines, means are shown and described for clamping the table to the post of the machine, and for adjusting it in height and swinging it laterally by means of a screw. I prefer the devices therein shown, and need not, therefore, describe them in detail here; they are, however, shown in Figs. 1 and 2 of the accompanying drawing.

The elevating-screw G, described in my patent above referred to, is squared upon its upper end, so as to be turned by a wrench, instead of which I now mount upon the end of this screw the wheel H, Fig. 3, which is driven by the spiral pinion I on the inclined shaft J, which is mounted in proper bearings in the stand V, and is actuated by the bevel-wheels K and L from the shaft M. This shaft M is fitted to turn and slide freely through its bearings in the column A, and carries on each end cones O and O', fitting the inside of the rims of the pulleys P and P', thus forming two friction-clutches, that can be thrown into and out of gear by sliding the shaft M endwise through its bearings by means of the hand-lever R.

In such drilling-machines previous to my present invention, the shaft M merely served as a stud to support the two carrying-pulleys P and P', which carry the endless belt W from the driving-pulley S to the pulley T, driving the drill-spindle, and had no other function.

It is evident that by clutching this shaft with one or the other of the two carrying-pulleys, which run in opposite directions, the screw G may be turned to raise or lower the table. The power may be transmitted from the pulleys P and P' to the elevating-screw G by a variety of well-known mechanical devices, differing from those which I have described as the preferred construction; but all of these are simply equivalents at the command of any skilled mechanic, and obviously within the scope of my improvements.

Having thus described the nature and objects of my invention, what I claim as new, and desire to secure by Letters Patent, is—

1. In vertical drilling-machines, the combination of the carrying-pulleys P and P' with the elevating-screw G, substantially as and for the purposes set forth.

2. The combination of the elevating-screw G, the pulleys P and P', and the friction-clutches, substantially as and for the purposes set forth.

WM. SELLERS.

Witnesses:
H. C. FRANCIS,
H. A. FULTON.